| United States Patent [19] | [11] Patent Number: 5,054,271 |
| DeWoskin | [45] Date of Patent: Oct. 8, 1991 |

[54] PACKAGING APPARATUS

[75] Inventor: Irvin S. DeWoskin, St. Louis, Mo.

[73] Assignee: Barnhart Industries, Inc., Barnhart, Mo.

[21] Appl. No.: 583,455

[22] Filed: Sep. 17, 1990

[51] Int. Cl.⁵ .............................................. B65B 47/00
[52] U.S. Cl. ...................................... 53/559; 53/329; 53/574; 493/124
[58] Field of Search ................. 53/329, 373, 377, 574, 53/558, 559; 198/372, 465.2; 206/462; 221/211; 493/123, 124, 125

[56] References Cited

U.S. PATENT DOCUMENTS

| 3,075,330 | 1/1963 | Swezey | 206/462 X |
| 3,199,263 | 8/1965 | Lee | 53/558 |
| 3,418,785 | 12/1968 | Duryee | 53/373 |
| 3,552,092 | 1/1971 | Jenkins | 53/373 X |
| 3,657,857 | 4/1972 | De Woskin et al. | 53/559 X |
| 3,866,393 | 2/1975 | Warner et al. | 53/329 X |
| 3,946,537 | 3/1976 | Hair et al. | 53/559 |

Primary Examiner—Robert L. Spruill
Assistant Examiner—Daniel B. Moon
Attorney, Agent, or Firm—Senniger, Powers, Leavitt & Roedel

[57] ABSTRACT

Packaging apparatus for production of display packages in which an item is packaged on a card sealed under a transparent film, the cards each having a window being carried through the apparatus on jigs which are indexed around in an endless path travelling from a card-applying station to a film-applying station, a packing station, a heat-sealing station, a package ejection station and back to the card-applying station, with automatic application of a card to each jig at the card-applying station.

10 Claims, 9 Drawing Sheets

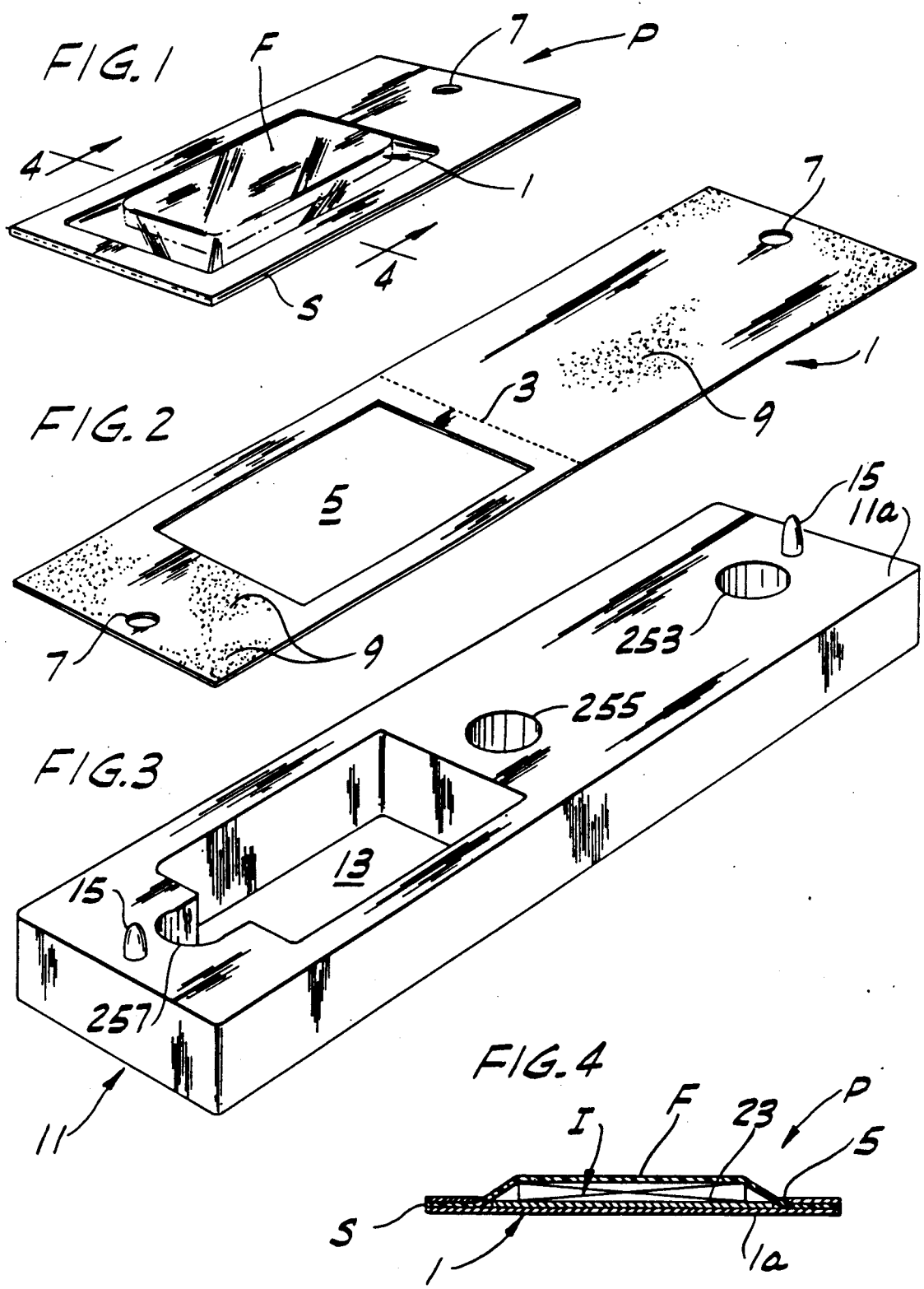

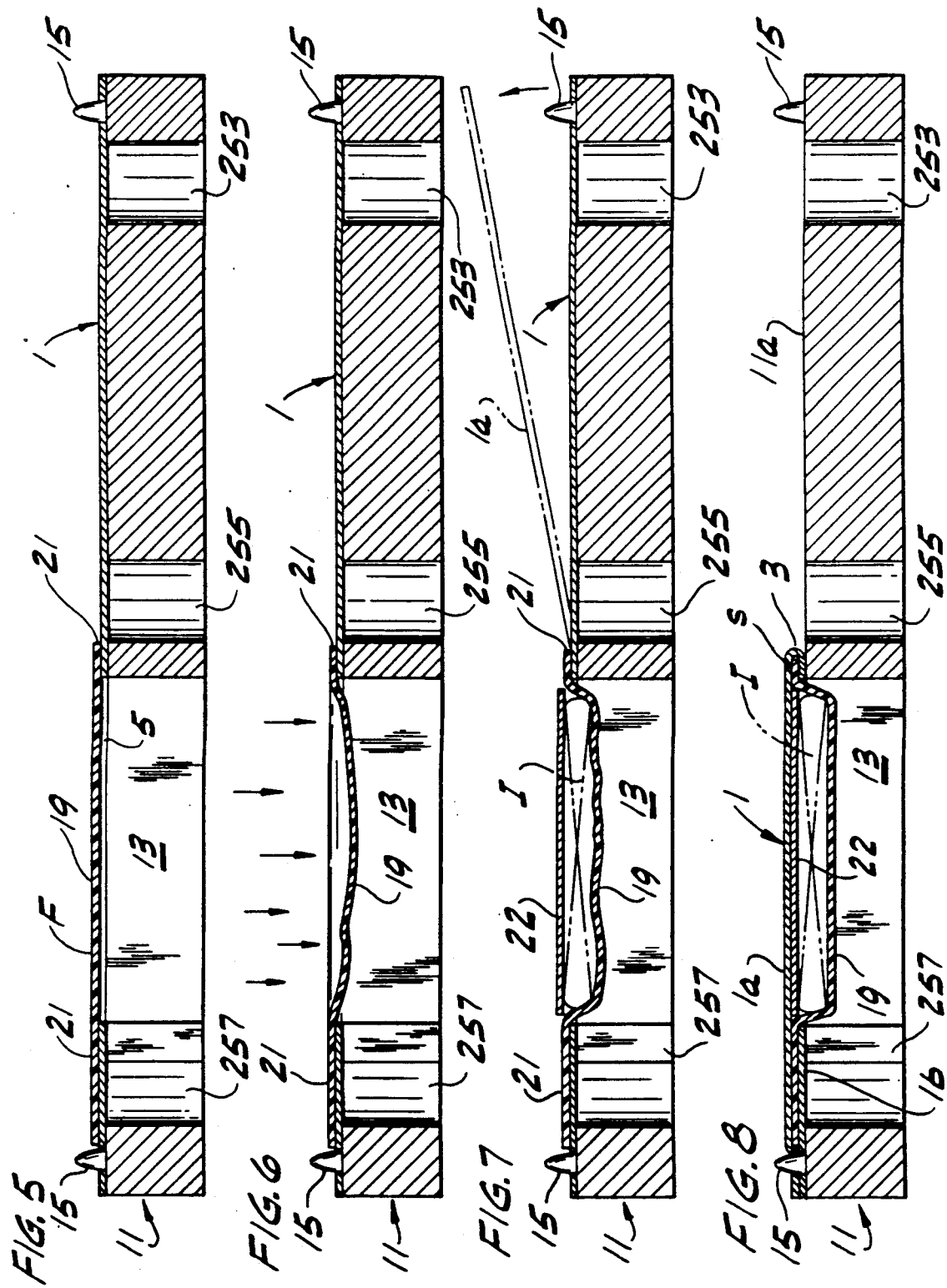

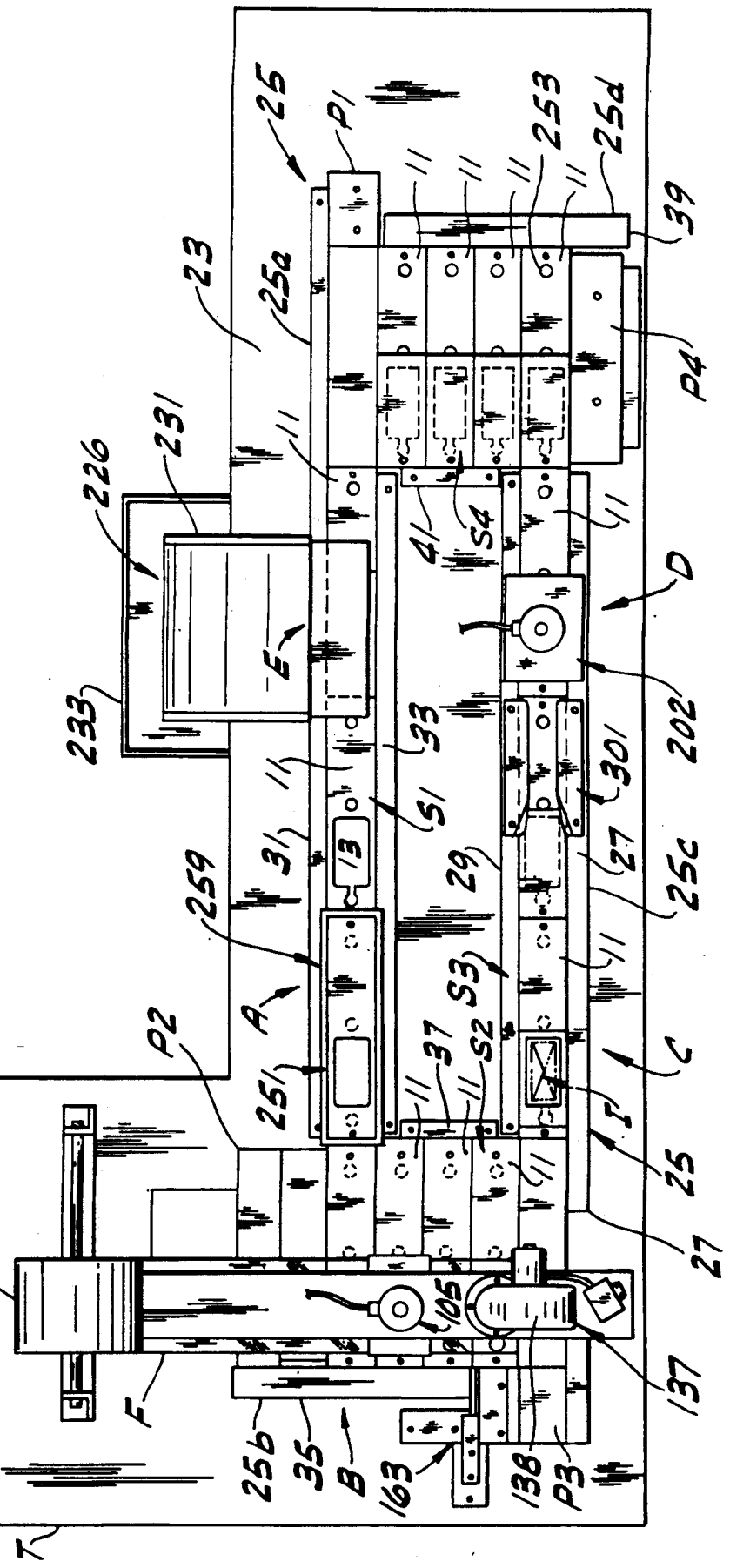

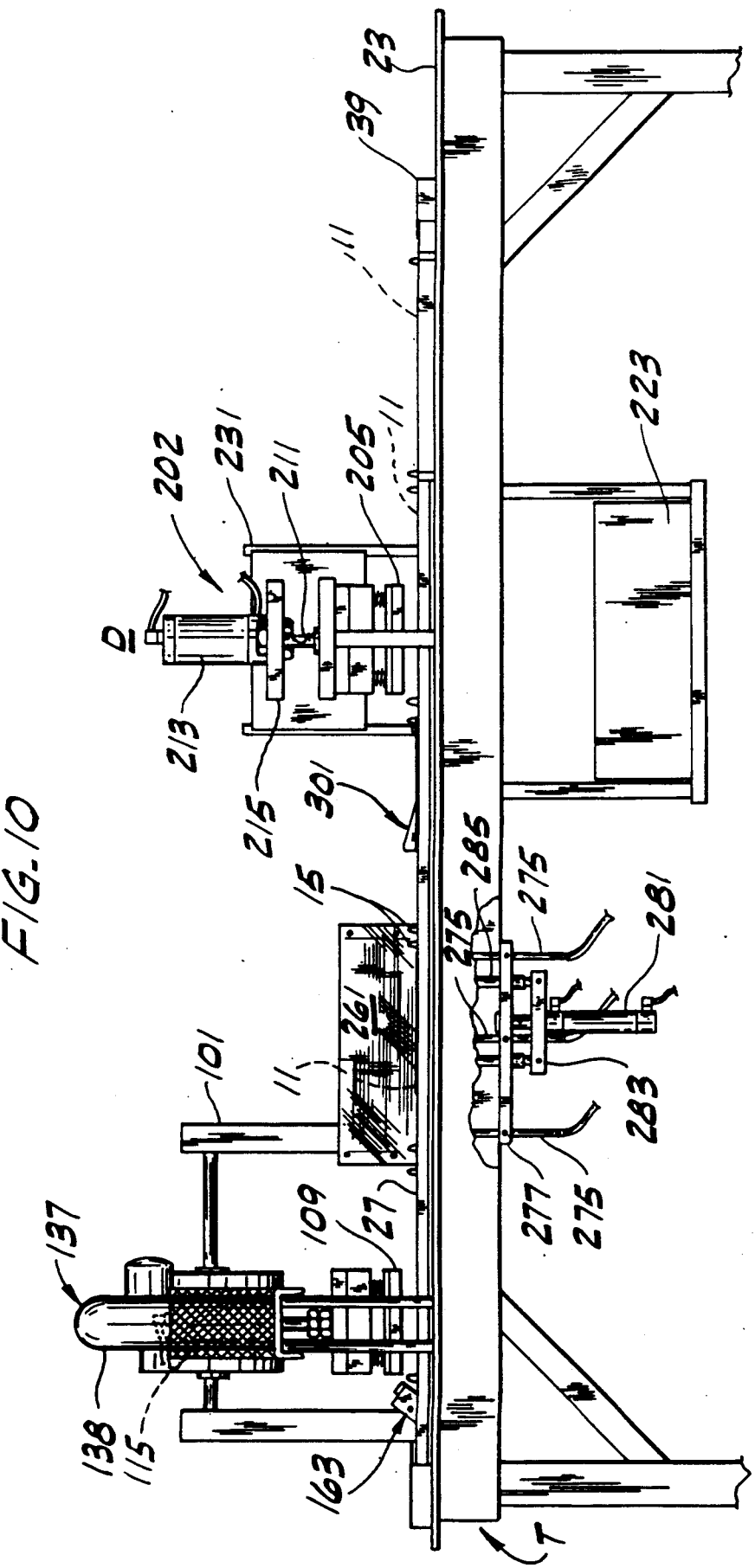

PACKAGING APPARATUS

BRIEF SUMMARY OF THE INVENTION

This invention relates to packaging apparatus, and more particularly to apparatus for forming display packages utilizing cards and transparent plastic film.

The invention involves improvements on packaging apparatus such as shown in my U.S. Pat. Nos. 3,030,752 and 3,139,712 and more particularly 3,657,857, being especially directed toward production of display packages in which an item is packaged on a card sealed under a transparent plastic film, but not limited thereto. The cards, each having a window, are carried through the apparatus on jigs or platens which are guided for movement in an endless path, the film being applied to the cards held on the jigs, items to be packaged being placed on the film on the cards, after which the cards are folded over and their top halves sealed down.

Among the several objects of the invention may be noted the provision of such apparatus which is more completely automated, including automation of placement of the cards on the jigs; the provision of such apparatus in which the sealing is readily, effectively and economically accomplished by heat sealing means operable through the card around the window; and the provision of such apparatus having improved means for ejecting completed packages from the jigs.

In general, apparatus of this invention, for forming packages utilizing rectangular cards each adapted to be folded over on a fold line and having a window opening on one side of the fold line, comprises a series of jigs each of rectangular outline corresponding to the outline of the rectangular card, each jig having an opening therein corresponding to the window opening in the card and means engageable with a card for locating a card thereon with said openings in register, and means for intermittently feeding forward the series of jigs through a card-applying station, a film-applying station, a packing station, and a sealing station for forming a package, each jig being fed back to the card-applying station after removal of a completed package therefrom. The apparatus is characterized in having means at the card-applying station for applying a card to the jig at said card applying station, said card-applying means comprising a magazine for holding a stack of cards at said card-applying station above the jig at said card-applying station, said magazine having an open bottom and being adapted to hold the stack of cards therein while permitting the lowermost card of the stack to be pulled down out of the bottom, and means for pulling the lowermost card down out of the magazine and applying it to a jig on top of the jig, The latter means comprises a plurality of vacuum grippers movable up and down through openings provided therefor in the jigs, said grippers being movable up through said openings into engagement with the bottom face of the lowermost card in the magazine for vacuum gripping the card, and movable down to a position below the jig to place the card on the jig properly located by the locating means on the jig and to clear the jig for being fed forward to the film applying station.

BRIEF DESCRIPTION OF THE DRAWINGS

FIG. 1 is a perspective of a package such as may be produced by the apparatus of this invention;

FIG. 2 is a perspective of a card used in making the FIG. 1 package, showing the card in its initial flat unfolded condition;

FIG. 3 is a perspective of a jig used in the apparatus;

FIG. 4 is an enlarged transverse section on line 4—4 of FIG. 1;

FIGS. 5-8 are longitudinal sections of the jig illustrating successive steps in the formation of a package by the apparatus;

FIG. 9 is a plan of apparatus made in accordance with this invention;

FIG. 10 is a front elevation of FIG. 9;

Corresponding reference characters indicate corresponding parts throughout the several views of the drawings.

DETAILED DESCRIPTION

Figure 11:
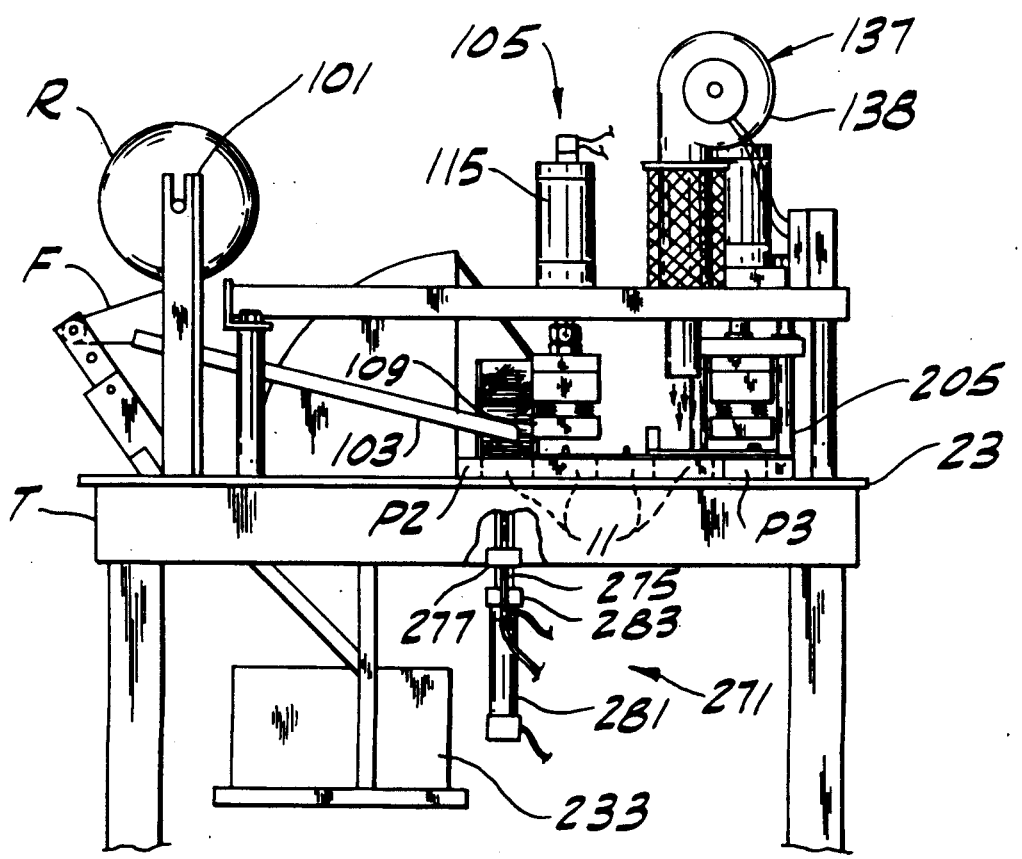
FIG. 11 is an end elevation of FIG. 9.
Figure 12:
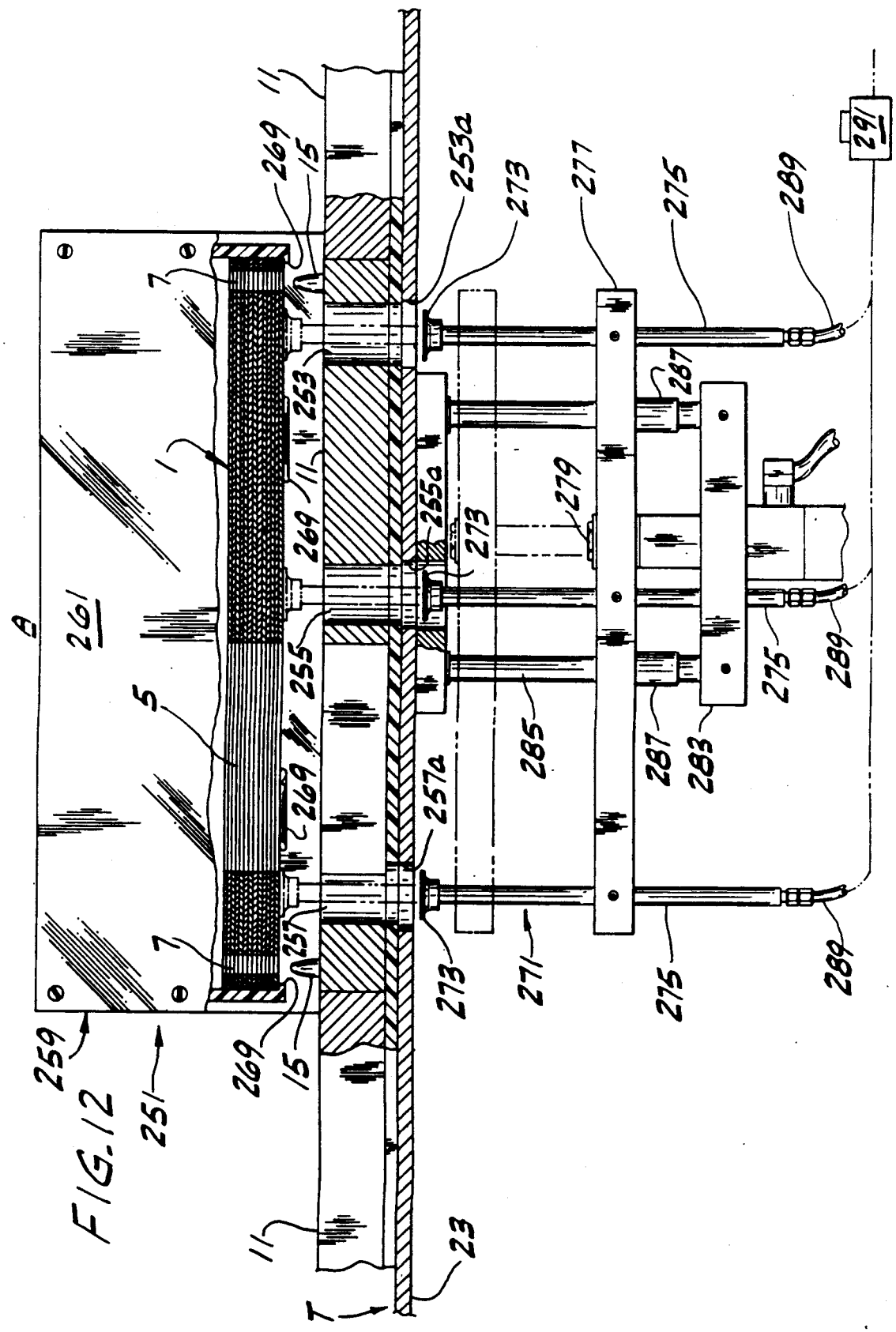
FIG. 12 is a view partially in elevation and partially in section of card magazine and means for putting the lowermost card down out of the magazine, the latter being shown in its lowered retracted position in solid lines and in its raised position in phantom.
Figure 13:
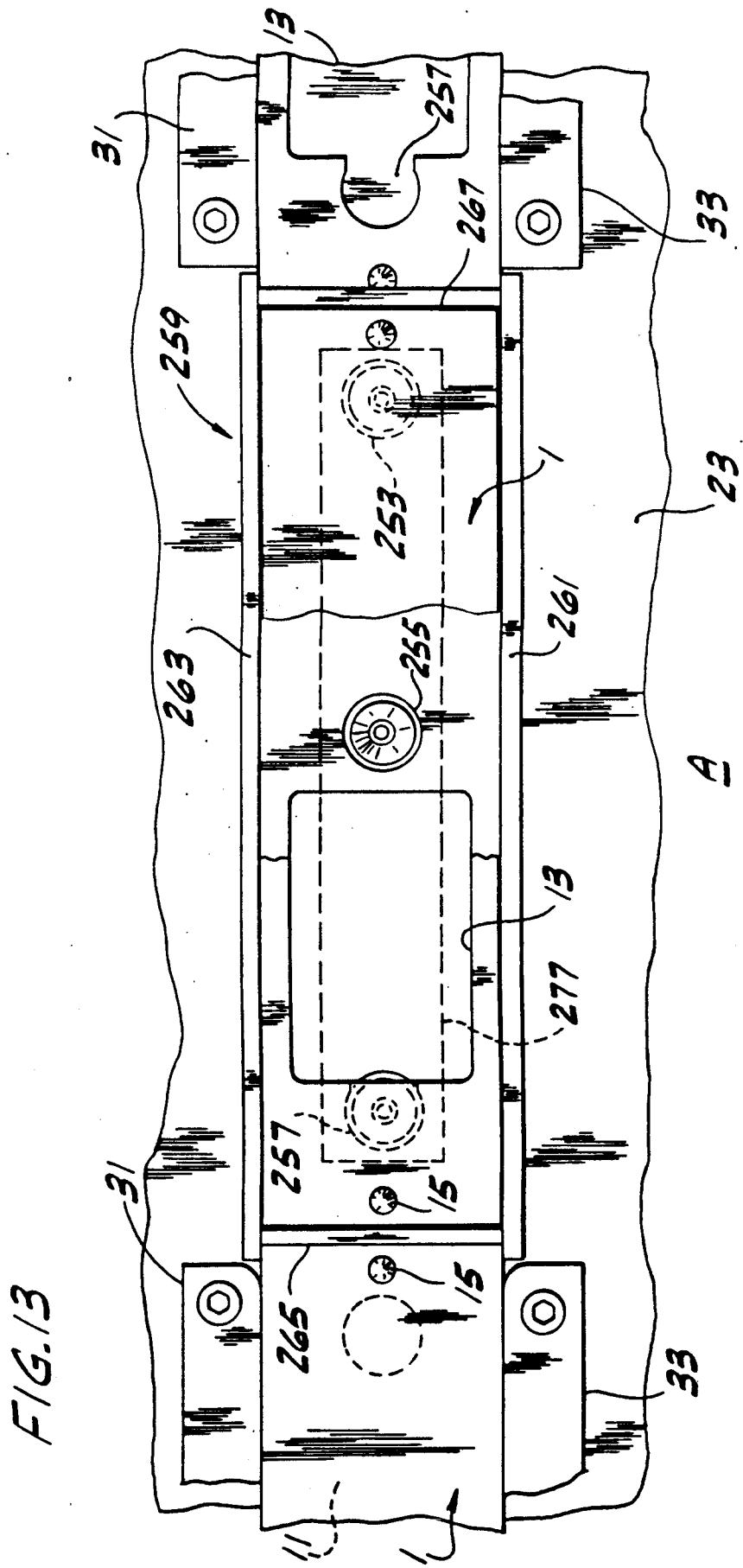
FIG. 13 is a plan of FIG. 12, with the cards in the magazine broken away.

Referring to the drawings, FIG. 1 shows a package P such as may be made by the apparatus of this invention, utilizing the card 1 best illustrated in FIG. 2. The card, which is made of suitable heavy paper stock or cardboard, is of elongate rectangular shape, and is provided with a transverse score line 3 at the center of its length constituting a fold line on which it may be folded in half. As illustrated in FIG. 2, the card has a window opening 5 therein in one of its two halves, and holes 7 adjacent its ends, these holes being adapted to register when the card is folded in half on line 3 to form a hole for hanging the package on a pin or peg of a display rack for displaying the packages. One face of the card has a coating 9 of heat-sealable plastic material thereon, such as a vinyl resin, e.g., polyvinyl chloride. This face is on the inside when the card is folded in half. The other face (the outside face when the card is folded in half) may bear suitable printing.

At 11 in FIG. 3 is indicated a jig which comprises an elongate rectangular flat bar having a rectangular opening 13 in one half thereof, this opening corresponding in size and shape and location to the window opening in card 1. Extending up from face 11a of the jig (constituting its top face) adjacent the ends of the jig are pins 15 for entry in holes 7 in card 1.

In the operation of the apparatus of this invention, a card 1 is applied to the top face of the jig as shown in FIG. 5 with the coated face of the card up, pins 15 extending up through holes 7 in the card to register the card on the jig, thus registering the window opening 5 in the card with the opening or recess 13 in the jig. A heat-sealable transparent plastic film F is applied over the card covering the window opening 5 to form a window 19 and is heat-sealed to the card via the coating 9 on the card all around the window opening 5 as indicated at 21 (see FIG. 5). After the heat-sealing operation, the film window 19 is heated to soften it (see FIG. 6). An item I, such as a coil of elastic, is placed on the heated window 19 and pushed down, stretching the heated window to form a pocket for the item, and a card 22 may be placed on top of the item (see FIG. 7). Then the top half 1a of the card is folded over on top of the windowed half 1b of the card and the two halves of the card and the film are sealed together as indicated at S substantially all around the window opening 5 in the card to complete the formation of the package P (see FIGS. 1, 4 and 8). The film window 19, having been stretched while hot at room temperature, tends to revert to its original condition before stretching, and thus subsequently shrinks around the item I to constitute the package as a skin package.

Referring now to FIGS. 9 and 10, apparatus made in accordance with this invention for forming the packages is shown to comprise a table T similar to that shown in my aforesaid U.S. Pat. No. 3,657,857, the top 23 of which is provided with means indicated generally at 25 for guiding an endless series of the jigs 11 for movement in an endless path, more particularly a rectangular path. The guide means 25 has front and back reaches 25c and 25a constituting the two opposite long sides of the stated rectangular path, and end reaches 25b and 25d constituting the two opposite ends of the rectangular path. The guide means is constituted by pairs of parallel bars secured to the table top 23, the bars of the pair defining the front reach 25c being indicated at 27 and 29, the bars of the pair defining the back reach 25a being indicated at 31 and 33, the bars of the pair defining the end reach 25b being indicated at 35 and 37 and the bars of the pair defining the other end reach 25d being indicated at 39 and 41. The parallel bars 27 and 29 of the front reach 25c and the parallel bars 31 and 33 of the back reach 25a are spaced a distance slightly greater than the width of a jig 11, and the jigs 11 in these reaches are disposed end-to-end. The parallel bars 35 and 37 of the end reach 25b and the parallel bars 39 and 41 of the other end reach 25d are spaced a distance slightly greater than the length of a jig 11 and the jigs 11 in each of these end reaches are disposed side-to-side extending transversely with respect to the bars.

A plurality of the jigs constituting a series S1 are disposed end-to-end in a row in the back reach 25a of the guide means 25 and are guided for sliding over the table top in the direction of the length of the jigs by the bars 31 and 33 from right to left as viewed in FIG. 9. A plurality of jigs constituting a series S2 are disposed in the end reach 25b of the guide means 25, the jigs in this series S2 being disposed side-to-side (i.e., the long sides of adjacent jigs in series S2 engage one another) and being guided for sliding over the table top 23 toward the front of the apparatus in the direction transverse to the length of the jigs by bars 35 and 37. The leading (i.e., the front) jig of series S2 constitutes the trailing jig (the left end jig) of a series S3 of the jigs disposed in the front reach 25c of guide means 25. The jigs in series S3 are disposed end-to-end in reach 25c and are guided for sliding over the table top 23 end-to-end from left to right by the bars 27 and 29. A plurality of jigs constituting a series S4 is disposed in the right end reach 25d of the guide means 25. The jigs in series are disposed side-by-side (i.e., with the long sides of adjacent jigs engaging one another) and are guided for sliding over the table top 23 from front to back in the direction transverse to the length of the jigs by bars 39 and 41. As shown in FIG. 9, there is a one-jig gap in the rectangular concatenation of jigs at the trailing (right) end of series S1, which is also the leading (back) end of series S4, and another one-jig gap at the trailing (left) end of series S3, which is also the leading (forward) end of series S2.

A pusher P1 is provided for pushing series S1 of jigs from right to left. A pusher P2 is provided for pushing series S2 toward the front of the apparatus. A pusher P3 is provided for pushing series S3 from left to right, and a pusher P4 is provided for pushing series 54 toward the back of the apparatus.

Means is provided for actuating pushers P1 and P3 in unison for pushing series S1 to the left and series S3 to the right one jig length, and then returning these pushers to their retracted position shown in FIG. 9. Means is provided for actuating pushers P2 and P4 in unison for pushing series S2 in the direction toward the front of the apparatus and for pushing series S4 in the direction toward the back of the apparatus, and then returning these pushers to their retracted position shown in FIG. 9. The actuating means for pushers P1–P4 may be the same as shown for these pushers in U.S. Pat. No. 3,657,857, and reference may be made thereto for full details.

During each cycle of the apparatus, pushers P1 and P3 are actuated through a forward stroke (i.e., pusher P1 is driven toward the left and pusher P3 is driven toward the right as viewed in FIG. 9 one jig length to advance each series S1 and S3 of jigs one jig length). This advances the jig at the leading (left) end of series S1 into position as the trailing jig of series S2, and advances the jig at the leading (right) end of series S3 into position as the trailing jig of series S4. Pushers P1 and P3 are then retracted and pushers P2 and P4 are then actuated through a forward stroke (i.e., pusher P2 is driven down as viewed in FIG. 9 and pusher P4 is driven up as viewed in FIG. 9) one jig width to advance each series S2 and S4 of jigs one jig width.

The jigs in series S1 proceed endwise intermittently to and through a station A where cards 1 are applied thereto. As will be detailed, in accordance with this invention the application of the cards to the jigs is automated. The jigs in series S2 proceed sidewise intermittently to and through a film-applying station B where a web of transparent film F from a supply roll R is applied thereto overlying the cards on the jigs in series S2, and the film is sealed to the cards, and severed between successive cards on successive jigs. The cards on the jigs in series S2 are fed in the direction transverse to the length of the card and thus in the direction of length of the fold line 3 of each card. The jigs in series S3 proceed endwise intermittently to and through a packing station C where an item such as I is placed on the window 9 and pushed down as described and the card is folded over on fold line 3, proceed thence to a sealing station D where the two halves of the folded card are sealed together to complete the formation of a package. The cards on the jigs in series S3 are fed in the direction of their length and thus at right angles to the direction of length of the fold line 3 of each card. The jigs then turn the corner and proceed in series S4 toward the back of the apparatus. They then proceed toward the left in series S1 and the completed packages are ejected from the jigs at station E by improved ejecting means of this invention to be decided; then the emptied jigs return to station A.

At 101 is indicated a roll stand on table T for holding the roll R of transparent film F. The film has a width somewhat greater than the length of the window opening 5 in a card 1. The stand 101 holds the roll with the film in line with the row of window openings 5 in the cards on the jigs in series S2, and with the film thus disposed for being applied to the cards on the jigs in series S2 overlying the window openings in the cards on these jigs. Film withdrawn from roll R passes through a guide 103 extending over series S2 adjacent the trailing end of this series for guiding the film into position over the jigs in series S2. As herein illustrated, there are four jigs in series S2. As shown best in FIG. 11, the guide 103 extends over the trailing one of these jigs, and the film extends down from the guide and forward over the next three jigs.

Means indicated generally at 105 in FIGS. 9 and 11 is provided for sealing the film to the card 1 on the second jig 11 of series S2. This means may correspond to the means 105 shown in U.S. Pat. No. 3,657,857 except that it has only one die block 109 instead of two, since there is only one window in the card, and reference may be made thereto for details. The air cylinder for moving the die block 109 up and down is indicated at 115.

Means indicated generally at 137 in FIGS. 9-11 is provided for heating the film window 19 of the card on the fourth jig 11 of series S2 to soften it. This means comprises means for blowing hot air on the film window 19, including a blower 138 and a heater (not shown).

Means indicated generally at 163 is provided for severing the film between the cards on the third and fourth jigs 11 of series S2. This may be essentially the some as means 163 shown in U.S. Pat. No. 3,657,857 and reference may be made thereto for full details.

Means indicated generally at 202 is provided at the sealing station D for sealing the two halves of the folded card together at 21 around the opening therein.

In accordance with this invention, and differing from U.S. Pat. No. 3,657,857, this means comprises a heated pressure head 205 (FIG. 10) at the lower end of piston rod 211 extending down from a piston (not shown) in an air cylinder 213 mounted on a platform 215 extending over the leading jig of series S3. The head has a flat bottom of rectangular shape somewhat larger than the window opening 5 in a card 1 for pressurized engagement with the folded-over top half of a card on the jig at station D all around the window opening 5 in that card. The head 205 is movable downwardly for said pressurized engagement of its bottom face with the card by the cylinder 213 in the same manner as the electrode 205 in U.S. Pat. No. 3,657,857 is movable downwardly by cylinder 213 of U.S. Pat. No. 3,657,857 with the pressure such, in conjunction with the temperature of the head, as to effect heating, through the top half of the card, of the coating 9 on the card and the margin of the film window 19 for sealing together the top half of the card (around the window opening), the margin of the film window, and the bottom half of the card. In this respect, the pressure is such as to effect such compression of the card as to increase its thermal conductivity for relatively rapid penetration of heat through the card to the coating and the film. This enables considerable reduction in machine cost.

Figure 15:
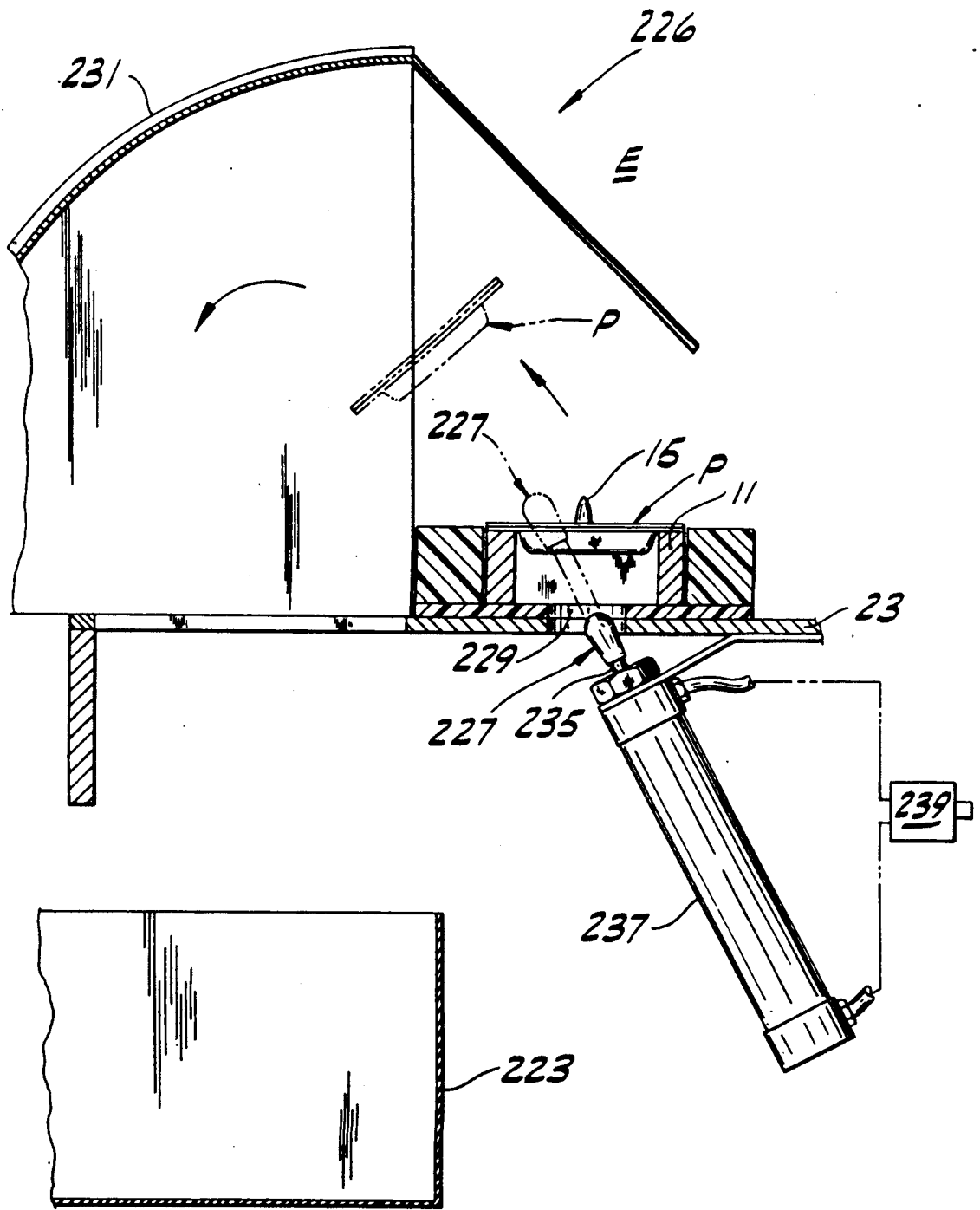
FIG. 15 is a view partially in elevation and partially in section showing means of the apparatus for ejection of completed packages.

Means indicated generally at 226 is provided at station E for ejecting completed packages from the jigs. In accordance with this invention, and differing from U.S. Pat. No. 3,657,857, this means (see FIG. 15) comprises an ejector 227 at station E movable upwardly from a lowered retracted position under the table top 23 through a hole 229 in the table top and through the opening 13 in the jig for impelling the completed package P off the jig at station E upwardly and toward the rear, the ejected package P being guided by a hood 231 to fall into a collection receptacle 233. The ejector 227 is constituted by a knob on the upper end of the piston rod 235 of an air cylinder 237 mounted under the table top. A valve for controlling the air cylinder is indicated at 239.

In accordance with this invention, means generally designated 251 is provided at station A for automatically applying the cards to the jigs. For purposes of this invention, each jig is provided with three holes 253, 255 and 257 extending all the way therethrough from its bottom to its top face. Holes 253 and 255 are in the solid half of the jig, hole 253 being adjacent the end of the jig remote from the opening 13 in the jig, and hole 255 being adjacent the opening 13, generally at the center of the length of the jig. Hole 257 is located at the end of opening 13 away from the solid half of the jig, and merges with opening 13. A magazine 259 for holding a stack 260 of cards 1 is provided at station A above the table, and more particularly above the position of the jig at station A. The magazine has side walls 261 and 263 spaced a distance slightly greater than the width of the card 1, end walls 265 and 267 spaced a distance slightly greater than the length of the flat unfolded card, with narrow flanges or ledges such as indicated at 269 extending inwardly at the bottom of the walls of the magazine for supporting the stack while leaving the bottom of the magazine open for exposing the bottom face of the lowermost card of the stack in the magazine.

Figure 14:
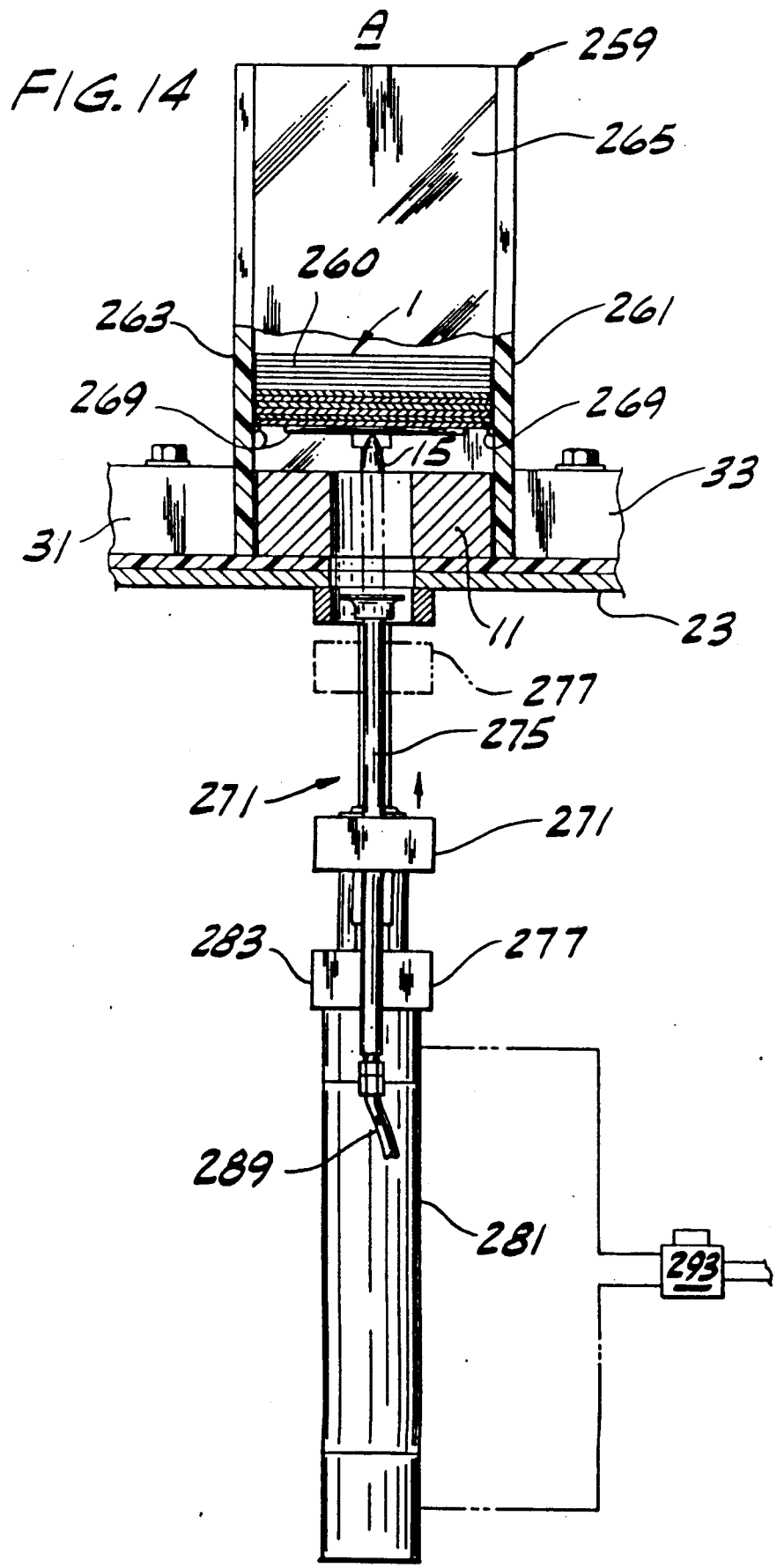
FIG. 14 is an end elevation of FIG. 12 with parts broken away and shown, in section.

The flanges or ledges 269 are sufficiently wide to hold up the stack but so narrow as to permit the lowermost card of the stack to be pulled down out of the bottom. Means indicated generally at 271 is provided for pulling the lowermost card down out of the magazine and applying it to the jig at station A on top of the jig, this means comprising three vacuum grippers each designated 273 movable up through three holes 253a, 255a and 257a in line with the three openings 253, 255 and 257 in that jig from a lowered retracted position below the top 23 of table T into engagement with the exposed bottom face of the lowermost card in the magazine for vacuum gripping that card and movable back down to said lowered retracted position to place the card on the jig properly located by entry of the pins 15 on the jig in the holes 7 in the card and to clear the jig for being fed forward to the film-applying station B. More particularly, each vacuum gripper 273 is at the upper end of a vacuum pipe 275 extending up from a crosshead 277 on the upper end of the piston rod 279 of an air cylinder 281 having its upper end mounted in a support 283 carried by rods 285 extending down from the table top 23. Crosshead 277 is guided by rods 285 as indicated at 287. Flexible vacuum lines 289 connect the pipes 275 to a source of vacuum (not shown), with a valve 291 for turning the vacuum on and off. Cylinder 281 is controlled by a valve 293 (FIG. 14).

Operation of the apparatus is basically the same as that described for the apparatus of U.S. Pat. No. 3,657,857, and reference is made thereto for details. Differences are that the cards are automatically (instead of manually) applied to the jigs at station A, the pocket-forming as described in U.S. Pat. No. 3,657,857 is omitted (being replaced by the heating of the film window by means 137, the sealing at station D is a heat-sealing operation instead of an RF sealing operation, and the ejection of a completed package at station E is by propulsion.

By reference to U.S. Pat. No. 3,657,857, it will be understood that each of the jigs 11 is intermittently indexed forward in its stated rectangular path, jigs in each of series S1 and S3 being intermittently indexed forward one jig length and those in each of series S2 and S4 being intermittently indexed forward one jig width. The indexing is by the operation of the pushers P1–P4. A complete cycle of operation of the apparatus in respect to the indexing of a jig 11 completely around its rectangular path of travel may be regarded as starting with the jig at station A in position to receive a card 1. Here the jig is directly below the magazine 259 with the three holes and therein in register with the holes 253a, 255a and 257a in the table and the vacuum grippers 273, the latter being in their lowered retracted position below the level of the jig (and the table). Valve is actuated as a result of pusher P3 completing its forward stroke (refer to U.S. Pat. No. 3,657,857) bringing the jig into card-receiving position at station A to actuate valve 293 to operate cylinder 281 to drive piston rod 279 and the three vacuum grippers 273 up through the holes in the table and the openings 253, 255 and 257 in the jig and into engagement with the lower face of the lowermost card 1 in the magazine 259. Valve 291 is also actuated to draw a vacuum in the vacuum grippers 273 so that they grip the lowermost card. Upon retraction of the pushers P1 and P3 as described in U.S. Pat. No. 3,657,857, valve 293 is deactuated and operates cylinder 281 to drive piston rod 279 and the three vacuum grippers 273 down to the lowered retracted position below and clear of the jig. As the grippers move down, they pull the card down out of the magazine (the card flexing to come off the ledges 269) and bring the card down flat on top of the jig, the pins 15 on the jig entering the holes 7 in the card. Then, as the vacuum grippers 173 pass down through the holes in the jig, valve 291 is deactuated to cut off the vacuum, and the grippers move on down to their lowered retracted position, leaving the card lying flat on the top face of the jig, in registered position by entry of the pins 15 in holes 7.

On actuation of pushers P1 and P3 to push series S1 and S3 of the jigs forward one jig length as in U.S. Pat. No. 3,657,857, the jig 11 with the card 1 thereon is moved into position at the trailing end of series S2. On the advance of pusher P3, film F extending over series S2 of jigs is cut by the film-cutting means 163 as in U.S. Pat. No. 3,657,857. On subsequent actuation of pushers P2 and P4 to push series S2 and S4 one jig width as in U.S. Pat. No. 3,657,857, the jig 11 carrying the card 1 is advanced to position as the second jig of series S2 under the heat-sealing head 109 of heat-sealing means 105, and the latter is actuated to effect heat-sealing of the film F overlying the card to the card all around the window opening 5 in the card. On subsequent actuation of pushers P2 and P4 to push series S2 and S4 forward one jig width, the jig carrying the card with the film sealed thereto is advanced one jig width to position as the fourth jig of series S2 and there the film window 19 (sealed to the card) is heated by the hot air delivered by the means 137 to soften the film window 19 and enable it to sag and form a pocket. The film is severed between the third and fourth jigs of series S2. On subsequent actuation of the pushers P1 and P3, the jig carrying the card with the film window 19 sealed thereto and heated for forming a pocket is advanced into the packing station C where an item is manually placed in the pocket formed by the window. The unwindowed half of the card is folded over on fold line 3 to cover the pocket, folding being completed by folding means such as indicated at 301 in FIGS. 9 and 10. On subsequent actuations of the pushers, the jig with the folded-over card is brought into position at the sealing station D, under the heat-sealing head 205 and the valve for cylinder 213 is actuated as in U.S. Pat. No. 3,657,857 to drive down the head 205 (which is heated) to heat-seal together the two halves of the card and the film window all around the window opening in the card. The valve is deactivated to operate the cylinder 213 to raise the head. Upon subsequent actuations of the pushers, the card with the completed package P thereon is brought to the ejection station E, at which point valve 239 is actuated to operate cylinder 237 to drive piston rod 235 and knob 227 rapidly upwardly to impel the package P on the jig at station E up and to the rear to drop into the collection receptacle 233.

Apparatus of this invention is adopted for production of packages other than the package P herein illustrated. For example, it is adapted for production of a box-type package similar to that illustrated in my U.S. Pat. No. 3,486,615, using a card as illustrated in that patent and a forming tool for forming the card into a box.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for forming packages utilizing rectangular cards each adapted to be folded over on a fold line and having a window opening on one side of the fold line, comprising a series of jigs each of rectangular outline corresponding to the outline of the rectangular card, each jig having a first opening therein corresponding to the window opening in the card, second openings therein to facilitate loading of the cards onto said jig and means engageable with a card for locating a card thereon with said openings in register, means for intermittently feeding forward the series of jigs through a card-applying station, a film-applying station, a packing station, and a sealing station for forming a package, each jig being fed back to the card-applying station after removal of a completed package therefrom, characterized in having means at the card-applying station for applying a card to the jig at said card applying station, said card-applying means comprising a magazine for holding a stack of cards at said card-applying station above the jig at said card-applying station, said magazine having an open bottom and being adapted to hold the stack of cards therein while permitting the lowermost card of the stack to be pulled down out of the bottom, and means for pulling the lowermost card down out of the magazine and applying it to a jig on top of the jig, said means comprising a plurality of vacuum grippers movable up and down through said second openings provided therefor in the jigs, said grippers being movable up through said second openings into engagement with the bottom face of the lowermost card in the magazine for vacuum gripping the card, and movable down to a position below the jig to place the card on the jig properly located by the locating means on the jig and to clear the jig for being fed forward to the film applying station.

2. Apparatus as set forth in claim 1 wherein the jigs are movable in an endless rectangular path with a first series of jigs aligned end-to-end along one side of said path, a second series at one end of said path in which the jigs extend transversely of said path, a third series parallel to the first in which the jigs are aligned end-to-end along the other side of said path, and a fourth series parallel to the second in which the jigs extend transversely of said path, said card-applying station being adjacent the leading end of said first series, the film-applying station being along said second series, and the packing station and sealing station being along the third series.

3. Apparatus as set forth in claim 2 wherein the jigs are slidable on a table, the table having holes therein for the grippers, the grippers being movable up and down through the holes, each jig being movable to position at the card-applying station in which the second openings in the jigs for the grippers register with the holes in the table for the grippers.

4. Apparatus as set forth in claim 3 wherein the jigs are of elongate rectangular form and the grippers, and the holes and said second openings therefor are arranged in line lenghtwise with respect to the jigs and located to grip a card adjacent its ends and intermediate its ends.

5. Apparatus as set forth in claim 4 wherein the magazine has sides extending along the sides of said first series of jigs and ends and relatively narrow ledges adjacent the bottom supporting the stack of cards permitting the lowermost card to flex out of the bottom of the magazine.

6. Apparatus as set forth in claim 5 wherein said second openings comprise two holes in the half of the jig opposite the half with the first opening in the jig and a hole adjacent the end of the half with the first opening therein.

7. Apparatus as set forth in claim 2 having at the sealing station a heated head movable downwardly from a raised retracted position above the jig at the sealing station into pressure engagement with the half of the card folded over on top of the half with the window opening with the pressure sufficient to compress the material of the card for the transfer therethrough for sealing.

8. Apparatus as set forth in claim 2 having at a package ejection station along the first series upstream from the card-applying station means movable upwardly through the window opening in the jig at said ejection station for impelling the package upwardly and laterally away from the jig.

9. Apparatus as set forth in claim 8 wherein said impelling means comprises cylinder and piston means with a piston rod having means thereon for impacting on the bottom of the package through the first opening in the jig at said ejection station.

10. Apparatus as set forth in claim 9 having means for collecting the packages impelled off the jigs.

* * * * *